United States Patent [19]

Harkness

[11] 4,182,590
[45] Jan. 8, 1980

[54] ARTICLE LOADING AND HANDLING DEVICE

[76] Inventor: Travis O. Harkness, Rt. 1, Box 95-A, Kaufman, Tex. 75142

[21] Appl. No.: 826,345

[22] Filed: Aug. 22, 1977

[51] Int. Cl.² ............................................. B65G 67/02
[52] U.S. Cl. .................................... 414/24.5; 414/501
[58] Field of Search ............ 214/1 HH, 1 HA, 130 C, 214/518, DIG. 4

[56] References Cited

U.S. PATENT DOCUMENTS

| | | | |
|---|---|---|---|
| 3,584,736 | 6/1971 | De Mollie et al. | 214/130 C |
| 3,820,673 | 6/1974 | McVough | 214/77 R |
| 3,941,265 | 3/1976 | Nunnally, Jr. | 214/1 HA |
| 3,942,666 | 3/1976 | Pfremmer | 214/518 |

Primary Examiner—Joseph F. Peters, Jr.
Assistant Examiner—Ross Weaver
Attorney, Agent, or Firm—Larry B. Dwight

[57] ABSTRACT

Apparatus to transport cylindrical bales of material, such as hay, comprising a frame disposed on a tandem axle. A plurality of shafts are rotatably disposed between the side members of the frame, each of the shafts having a plurality of fork arms arranged in two separate planes disposed perpendicular to each other on the shaft to form a cradle. Hydraulic cylinders are operably connected to the shafts to rotate the shafts individually such that one set of fork arms are lying in a horizontal plane and the other set is lying in a vertical plane and rotation of the shaft moves the horizontal forks to a vertical plane and the vertical forks to the horizontal plane. The first set of fork arms pick up the round bale from the ground and move it to the second set of fork arms which sequentially moves the round bale to the front of the trailer. The bales are unloaded in a reverse direction.

2 Claims, 3 Drawing Figures

ARTICLE LOADING AND HANDLING DEVICE

BACKGROUND

The larger cylindrical bales of material such as hay and the like are becoming increasingly popular due to the fact that no baling wire is required and the bales may be stored in the field thus reducing the cost of constructing storage facilities. However, one problem with the large bales is handling them since the bales weigh about 1500 pounds each. Several methods have been developed using fork lifts to place the bales on a flatbed trailer or rolling the large bales on an inclined plane on a trailer or other similar apparatuses. Problems develop in rolling the large bales on a trailer in that they tend to unravel. In addition since it is formed of a soft, flexible type material such as hay it is difficult to get a large mass of the hay to roll successfully and it often slides, tearing loose fibers of the hay from the bale.

SUMMARY

I have devised an apparatus to transport large cylindrical, sometimes called round, bales of material such as hay and the like. The device comprises a frame disposed on a tandem axle, the frame being substantially open and without a bed. A plurality of shafts are disposed between the side members of the frame. Each shaft has two sets of staggered fork arms disposed in two planes perpendicular to each other. The shaft is adapted to rotate 90 degrees such that one set of fork arms may be moved from the horizontal plane to the vertical plane while the fork arms in the vertical plane are moved to the horizontal plane to transfer the round bales of hay in either a forward or rearward direction.

The fork arms pick the round bale of hay from the ground and move onto a set of fork arms which are lying in the horizontal plane. Rotation of the first shaft moves those fork arms to a generally vertical position to deposit the bale onto a second set of fork arms which are lying in the horizontal plane, and thus progressively to the opposite end of the trailer. Thus, the bale of hay is moved by sequential rotation while being securely cradled by the fork arms. The bales are not otherwise rolled nor dragged, and are unloaded back to the same relative position as existed prior to loading.

The primary object of the invention is to provide apparatus for transporting large round bales of material.

Another object of the invention is to provide apparatus which moves the round bales of material sequentially along the frame of the apparatus without rolling the bales which would cause significant stresses and unravelling of the material.

Another object of the invention is to provide an apparatus on which the bales are loaded and are not dragged or roller and are securely cradled at all time by the transporting apparatus to maximize safety in transporting the heavy bales of material.

A further object of the invention is to provide apparatus which is readily adaptable to being used on prime movers already in use on farms such that no special apparatus is necessary.

A further object of the invention is to provide apparatus which will load and transport the bales and place them back on the ground exactly as picked up such that minimum surface area is damaged by contact with the ground, thus minimizing loss of bale material.

Other and further objects will become apparent upon reading the detailed description hereinafter following and by referring to the drawings annexed hereto.

DESCRIPTION OF THE DRAWINGS

The drawings of a preferred embodiment are annexed hereto so that the invention may be more fully and readily understood, in which:

FIG. 3 is a diagrammatic view of the hydraulic control apparatus.

Numeral references are used in the drawings to designate the parts and like numerals are used throughout the various figures of the drawings to designate like parts.

DESCRIPTION OF A PREFERRED EMBODIMENT

Figure 1:
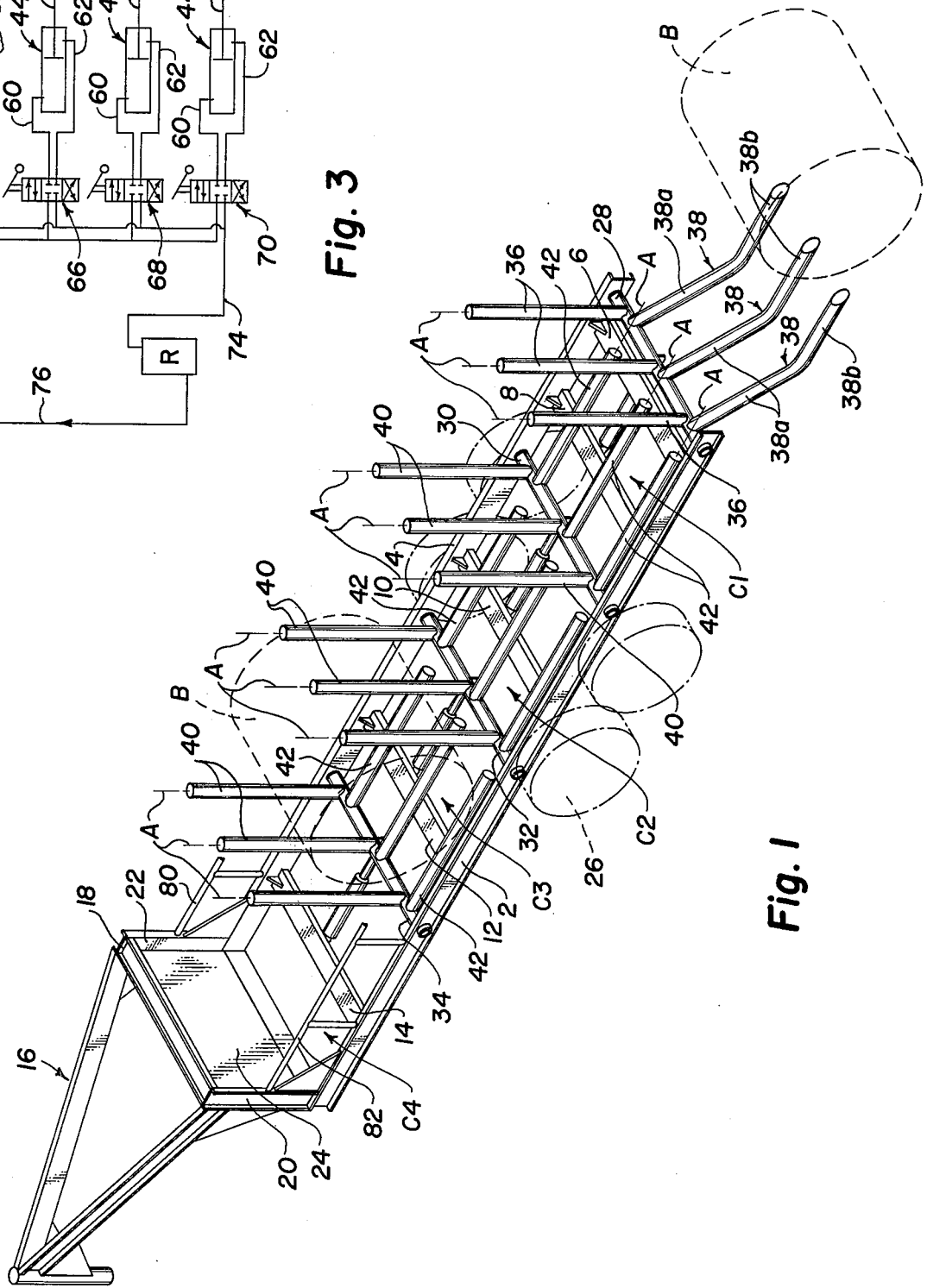
FIG. 1 is a perspective view of the transport apparatus.

Referring to FIG. 1, the device generally comprises a trailer having side frame members 2 and 4 spaced in parallel relationship and joined by transverse parallel end frame members 6, 8, 10, 12 and 14.

Means to join the trailer to a prime mover (not shown) may comprise a gooseneck hitch generally designated 16 commonly used on trailers of this type. Gooseneck hitch 16 is joined to a generally rectangular frame 18 having upwardly extending members 20 and 22 which are secured about end panel 24.

The trailer is mounted on a set of wheels such as a tandem axle and wheels 26 shown in dashed outline. It should be readily apparent that any type of axle and hitch generally used on trailers may be employed as long as it has sufficient loading capacity.

A plurality of rotatable shafts 28 and 30, 32 and 34 are journalled through side frame members 2 and 4 and suitably supported by bearings or the like.

Shaft 28 has a row of fork arms 36 disposed perpendicular to shaft 28 in a single plane. Fork arms 38 have an angularly disposed segment 38a and a segment 38b which is disposed at right angles to the plane which passes through fork arms 36 such that when segment 38b is parallel to the ground, fork arms 36 extend vertically.

Fork arms 38 are positioned, as shown in FIG. 1, to move the arm segments 38b under bale B, shown in dashed outline. Shafts 30, 32 and 34 each have two rows of fork arms 40 and 42 which are disposed in planes passing through each shaft 30, 32 and 34 perpendicular to each other. The first row of fork arms 40 is disposed in a first plane passing through the longitudinal axis A of each arm. The second row of fork arms 42 is disposed in a second plane passing through the longitudinal axis A of each arm said second plane being substantially perpendicular to the first plane. The fork arms 40 and 42 are staggered such that they intermesh and do not interfere with the adjacent fork arms or shafts on which they are mounted.

Figure 2:
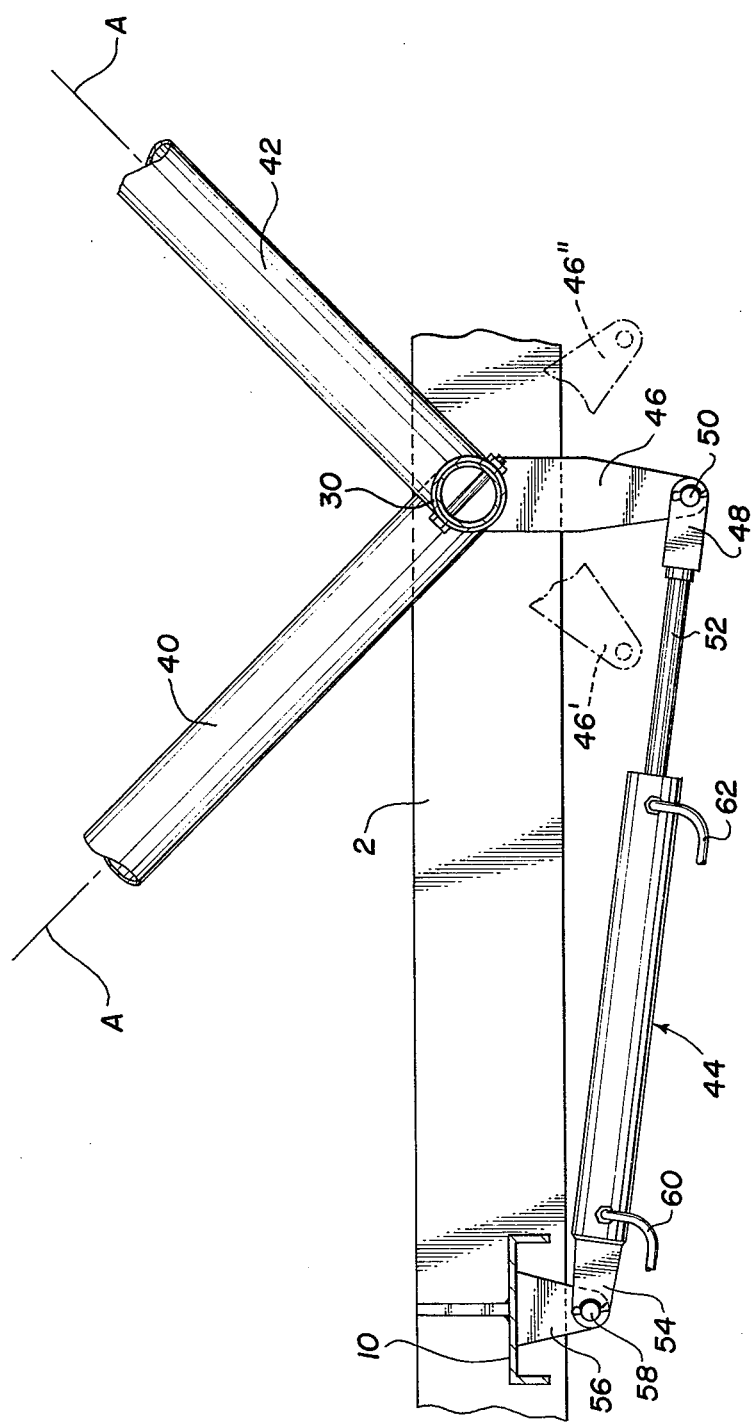
FIG. 2 is a side elevational view of the mechanism to rotate the shafts.

Actuated means to rotate the shafts 28, 30, 32, and 34 generally comprises hydraulic cylinders 44 best illustrated in FIG. 2. The hydraulic cylinders 44 are the same in construction and are secured to each of the shafts 28, 30, 32, and 34 in the same manner. A downwardly extending lug 46 is welded to a central portion of each shaft 28, 30, 32 and 34. Lug 46 is connected to clevis 48 by pin 50. Clevis 48 is secured to the outer end of piston rod 52 which is slideably disposed in the hydraulic cylinder 44. The other end of hydraulic cylinder 44 is connected by clevis 54 to downwardly depending lug 56. Downwardly depending lugs 56 are centrally disposed on cross members 8, 10, 12 and 14 to support each of the hydraulic cylinders 44. Clevis 54 is joined to lug 56 by pin 58.

As illustrated in FIG. 2, lugs 56 are moveable between a position 46' shown in dashed outline wherein rod 52 is fully retracted and arms 42 will be positioned in a generally horizontal plane. When rod 52 is fully extended lug 46 will be moved to a position 46" wherein arms 40 will be in a generally horizontally plane and arms 42 will be generally vertically disposed on shaft 30.

Hydraulic cylinders 44 have lines 60 and 62 connected thereto which are connected to a control means such as that illustrated in FIG. 3. Lines 60 and 62 are connected to four individual lever actuated 3-position, two-way valves 64, 66, 68 and 70. Each valve 64, 66, 68 and 70 controls shafts 28, 30, 32 and 34, respectively. It should be readily apparent that if more loading capacity of the trailer is desired additional sets of shafts and valves may be provided. One side of valves 64, 66, 68 and 70 is connected to a pressurized manifold 72 and the other side is vented by lines 74 to a reservoir R. The intake side of pump P is connected by line 76 to reservoir manifold 72. A suitable drive means such as gasoline motor M is connected to pump P to drive same.

Pressurized fluid is delivered through line 60 from pressure manifold 72 through each of the valves when actuated to extend rods 52 and line 62 vents pressure back through each of the valves 64, 66, 68 and 70 through line 74. To retract rod 52, pressure is delivered through line 62 and line 60 vents the cylinder 44 to line 74.

As it is readily apparent in FIGS. 1 and 2, the cylindrical bale B may be picked up by moving segments 38b of fork arms 38 under the bale and actuating valve 64 to extend rod 52 by rotation of shafts 28 in the counterclockwise direction. This moves fork arms 36 to a generally horizontal plane wherein bale B is moved on fork arms 36 and 42 on shaft 30 of the first compartment or cradle C1. The second valve 66 is engaged to extend rod 52 to rotate shaft 30 such that fork arms 42 are moved toward the vertical plane and fork arms 40 are lowered to the horizontal plane thus moving bale B to the second cradle C2 or compartment. Valve 68 is then actuated to extend rod 52 to move fork arms 42 on shaft 32 upwardly and lower fork arms 40 moving the bale B to cradle C3. Valve 70 is energized to extend rod 52 to rotate shaft 34 to extend fork arms 42 on shaft 34 upwardly to move the bale to cradle C4.

Side rails 80 and 82 are provided to limit the transverse movement of the bales B relative to side frame members 2 and 4. It should be readily apparent that removal of the bales is accomplished by the same method except that rod 52 is retracted to move the bale sequentially forward between the arms 40 and 42. Fork arms 40 and 42 provide a cradle which restrains movement of the bale B while it is being transported. When the second bale B is to be loaded the extended rods 52 are returned to their original position such that the remaining fork arms 40 which are free are extended in a vertical position ready to transport the next bale B to the next available cradle C1, C2, or C3. When the last bale is loaded in the cradle C1, the fork arms 38 will be extended vertically and fork arms 36 will be disposed under the last bale.

In this manner, bales B are sequentially moved from compartment or cradle C1 to cradle C4 and stored therein until unloaded. When unloaded, the bales B are returned to the ground in such a manner that the area of the bale B which was on the bottom is returned to the bottom. This is important since a thatch is formed on the bottom and this prevents a new area of thatch from forming.

It should be readily apparent that unloading of the trailer is accomplished by reversing the process for loading. That is, fork arms 36 are lifted moving the bale B from the first compartment or cradle C1 to the ground. Arms 36 are then moved back to a position parallel with side members 2 and 4 and arms 40 on shaft 30 are raised and arms 42 lowered. This moves the bale in cradle C2 to arms 36 which are raised to move the bale B to the ground by transferring it to arms 38. The process is repeated to transfer the bales from one cradle to the next until the trailer is unloaded.

It should be readily apparent that the hereinbefore described invention accomplishes the objects of the invention.

It should also be readily apparent that other and further embodiments of the invention may be devised without departing from the spirit and scope of the appended claims.

Having heretofore described my invention, I claim:

1. Apparatus to transport large cylindrical bales of material comprising: a frame having parallel side members joined in spaced relationship by connector members; a plurality of shafts rotatably supported between the side members in spaced relationship; two sets of fork arms disposed on one of said shafts adjacent one end of said frame, a first set of said fork arms being positioned substantially perpendicular to said shaft and the second set of fork arms having an angularly deflected portion secured to said shaft and a second portion secured to the end of the angularly deflected portion in a plane substantially perpendicular to the first set of fork arms such that when the first set of fork arms are vertical the second set of fork arms are positioned such that the second portions of each fork arm are substantially parallel to the ground in position to pick up a bale of material; two sets of fork arms arranged in rows on each of the remaining shafts, said sets being substantially perpendicular to each other; a lug depending from each of said shafts; a plurality of hydraulic cylinders, each cylinder being operably connected to each shaft by said lug such that as each cylinder is fully extended one set of fork arms is in a substantially horizontal position and the other is in a substantially vertical position and when the cylinder is fully retracted the position of each set of fork arms is reversed in direction.

2. The combination called for in claim 1 including control means comprising: a two-way, three-position valve operably connected to each hydraulic cylinder; a pump; and means connecting said pump to said source of fluid and valve.

* * * * *